United States Patent
Namburu et al.

(10) Patent No.: US 11,372,661 B2
(45) Date of Patent: Jun. 28, 2022

(54) SYSTEM AND METHOD FOR AUTOMATIC SEGMENTATION OF DIGITAL GUIDANCE CONTENT

(71) Applicant: Whatfix Private Limited, Bangalore (IN)

(72) Inventors: Maruthi Priya Kanyaka Vara Kumar Namburu, Bengalaru (IN); Aashish Jain, Bengalaru (IN); Animesh Agarwal, Bengalaru (IN); Subhadeep Guin, Bengalaru (IN)

(73) Assignee: Whatfix Private Limited, Bangalore (IN)

( * ) Notice: Subject to any disclaimer, the term of this patent is extended or adjusted under 35 U.S.C. 154(b) by 0 days.

(21) Appl. No.: 16/914,219

(22) Filed: Jun. 26, 2020

(65) Prior Publication Data

US 2021/0406047 A1 Dec. 30, 2021

(51) Int. Cl.
*G06F 17/10* (2006.01)
*G06F 9/451* (2018.01)
(Continued)

(52) U.S. Cl.
CPC ............ *G06F 9/453* (2018.02); *G06F 16/957* (2019.01); *G06F 16/9566* (2019.01)

(58) Field of Classification Search
CPC ..... G06F 9/453; G06F 16/957; G06F 16/9566
See application file for complete search history.

(56) References Cited

U.S. PATENT DOCUMENTS

| 7,203,620 B2 * | 4/2007 | Li | G11B 27/102 |
| | | | 702/181 |
| 7,415,675 B2 * | 8/2008 | Habon | G06F 9/453 |
| | | | 715/765 |

(Continued)

FOREIGN PATENT DOCUMENTS

| WO | WO02/29759 A2 | 4/2002 |
| WO | WO2010/141748 A1 | 12/2010 |

OTHER PUBLICATIONS

MDN Web Docs; CSS selectors; 9 pages; retrieved from the interent (https://developer.mozilla.org/en-US/docs/Web/CSS/CSS__Selectors) on Aug. 6, 2020.

(Continued)

*Primary Examiner* — Shahid K Khan
(74) *Attorney, Agent, or Firm* — Shay Glenn LLP (57) ABSTRACT

Provided herein are systems and methods for providing digital guidance in an underlying computer application. In one exemplary implementation, a method includes recording, in a computing device, steps of digital guidance content as the steps are created by a content author. The exemplary method also includes automatically segmenting, in the computing device, the digital guidance content as it is being created such that the digital guidance content is only associated with segments of the underlying computer application where the content is relevant. The exemplary method further includes making the digital guidance content available for playback to an end user on a computing device only when the end user is in a segment of the underlying computer application that is relevant to the digital guidance content.

24 Claims, 10 Drawing Sheets

(51) Int. Cl.
*G06F 16/957* (2019.01)
*G06F 16/955* (2019.01)

(56) References Cited

U.S. PATENT DOCUMENTS

| | | | | |
|---|---|---|---|---|
| 7,533,369 | B2* | 5/2009 | Sundararajan | G06F 8/73 |
| | | | | 717/106 |
| 7,849,405 | B1* | 12/2010 | Coletta | G06F 9/453 |
| | | | | 715/708 |
| 7,861,178 | B2* | 12/2010 | Lui | G06F 9/453 |
| | | | | 715/762 |
| 8,151,202 | B1* | 4/2012 | Cronin | G06F 8/34 |
| | | | | 715/764 |
| 8,707,177 | B1* | 4/2014 | Parle | G06F 9/453 |
| | | | | 715/713 |
| 8,850,315 | B1* | 9/2014 | Rogers | G06F 3/0482 |
| | | | | 715/767 |
| 9,063,757 | B2 | 6/2015 | Horton et al. | |
| 9,367,199 | B2 | 6/2016 | Klemenz et al. | |
| 9,514,437 | B2 | 12/2016 | Becker et al. | |
| 9,582,132 | B1 | 2/2017 | Adelman et al. | |
| 9,727,348 | B2 | 8/2017 | Chen et al. | |
| 10,489,041 | B1 | 11/2019 | Edwards et al. | |
| 10,585,686 | B2 | 3/2020 | Saurabh | |
| 10,802,846 | B2* | 10/2020 | Rider | G06Q 10/0633 |
| 2001/0017622 | A1 | 8/2001 | Patel et al. | |
| 2005/0147054 | A1* | 7/2005 | Loo | G06F 9/453 |
| | | | | 379/88.17 |
| 2006/0036991 | A1* | 2/2006 | Biazetti | G06F 9/453 |
| | | | | 717/104 |
| 2006/0085750 | A1* | 4/2006 | Easton | G06F 9/453 |
| | | | | 715/708 |
| 2006/0117315 | A1* | 6/2006 | Bussert | G06F 9/453 |
| | | | | 707/E17.061 |
| 2006/0277468 | A1* | 12/2006 | Sapir | G06F 9/453 |
| | | | | 715/708 |
| 2007/0168864 | A1* | 7/2007 | Yamamoto | G06F 16/739 |
| | | | | 715/716 |
| 2008/0301558 | A1* | 12/2008 | Najafi | G06F 9/453 |
| | | | | 715/708 |
| 2010/0180185 | A1* | 7/2010 | O'Hanlon | G06F 16/957 |
| | | | | 715/205 |
| 2010/0205529 | A1* | 8/2010 | Butin | G06F 8/38 |
| | | | | 715/704 |
| 2010/0205530 | A1* | 8/2010 | Butin | G06F 9/453 |
| | | | | 715/765 |
| 2011/0010612 | A1* | 1/2011 | Thorpe | G06F 16/957 |
| | | | | 718/100 |
| 2011/0035486 | A1* | 2/2011 | Seolas | G06F 16/957 |
| | | | | 709/224 |
| 2011/0246880 | A1* | 10/2011 | Horton | G06F 3/0481 |
| | | | | 715/708 |
| 2011/0307818 | A1* | 12/2011 | Eby | G06Q 10/103 |
| | | | | 715/769 |
| 2013/0055201 | A1* | 2/2013 | No | G06F 16/00 |
| | | | | 717/113 |
| 2013/0097497 | A1* | 4/2013 | Matejka | G06F 3/048 |
| | | | | 715/705 |
| 2013/0129316 | A1* | 5/2013 | Dontcheva | H04N 5/76 |
| | | | | 386/241 |
| 2013/0326406 | A1* | 12/2013 | Reiley | G06F 3/048 |
| | | | | 715/810 |
| 2014/0344683 | A1 | 11/2014 | Urunga et al. | |
| 2015/0202529 | A1* | 7/2015 | Paradise | A63F 13/30 |
| | | | | 463/31 |
| 2015/0220312 | A1 | 8/2015 | Jemiolo | |
| 2015/0242304 | A1 | 8/2015 | Akbulut et al. | |
| 2015/0254713 | A1* | 9/2015 | Brewer | G06Q 30/0256 |
| | | | | 705/14.54 |
| 2016/0004628 | A1 | 1/2016 | Gugri | |
| 2016/0162167 | A1 | 6/2016 | Shabazz et al. | |
| 2016/0246467 | A1 | 8/2016 | Jemiolo et al. | |
| 2016/0246615 | A1* | 8/2016 | Jemiolo | G06F 9/453 |
| 2016/0247534 | A1* | 8/2016 | Pan | G11B 27/031 |
| 2016/0350137 | A1* | 12/2016 | Kihara | G06F 9/453 |
| 2016/0351189 | A1* | 12/2016 | Miller | G06F 3/0482 |
| 2017/0052824 | A1* | 2/2017 | Sharma | G06F 9/453 |
| 2017/0134828 | A1* | 5/2017 | Krishnamurthy | H04N 21/4532 |
| 2017/0139656 | A1* | 5/2017 | Sterling | H04L 65/4069 |
| 2017/0177385 | A1* | 6/2017 | Fung | G06F 3/0484 |
| 2017/0316363 | A1* | 11/2017 | Siciliano | G06Q 10/06316 |
| 2017/0337122 | A1 | 11/2017 | Bolajwar et al. | |
| 2018/0121047 | A1 | 5/2018 | Goel et al. | |
| 2018/0143842 | A1 | 5/2018 | Weiss et al. | |
| 2019/0065512 | A1 | 2/2019 | Pestana et al. | |
| 2019/0066731 | A1* | 2/2019 | Jarrell | G06F 16/44 |
| 2019/0318764 | A1* | 10/2019 | Ishida | G11B 27/031 |
| 2019/0370559 | A1* | 12/2019 | Carter | G06V 20/52 |
| 2020/0021872 | A1* | 1/2020 | Venkatraman | H04N 21/2668 |
| 2020/0035113 | A1* | 1/2020 | Bruce | G09B 5/12 |
| 2020/0225927 | A1* | 7/2020 | Pachpande | G06F 8/61 |
| 2021/0158438 | A1* | 5/2021 | Greenberg | G06Q 40/025 |

OTHER PUBLICATIONS

Interactions Foundation; Help! I need some help! Not just any help help in mobile applications; 10 pages; retreived from the internet (https://www.interaction-design.org/literature/article/help-i-need-some-help-not-just-any-help-help-in-mobile-applicatons) on Aug. 6, 2020.

Userlane; 100 percent proficient with any software without it training; 13 pages; retreived from the internet (https://blog.userlane.com/navigation-system-software/) on Aug. 6, 2020.

Yeo; Here's how this company is tackling the challenges of enterprise tech adoption; 6 pages; retrieved from the internet (https://www.techinasia.com/heres-company-tackling-challengess-enterprise-tech-adoption) on Aug. 6, 2020.

Namburu et al.; U.S. Appl. No. 16/914,227 entitled "Element detection," filed Jun. 26, 2020.

* cited by examiner

SYSTEM AND METHOD FOR AUTOMATIC SEGMENTATION OF DIGITAL GUIDANCE CONTENT

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

There are many ways for end users to learn how to use a particular software application. Increasingly, many methods take the form of digital guidance, such as a Help Section built into the software application or links to online help content. Examples of online help or learning content include knowledge bases, answers to Frequently Asked Questions (FAQs), tutorials, videos, PDF documents, etc. "Walkthroughs" may be provided in either scenario, wherein the user is walked through a particular task or process step by step in the actual software application.

All of the digital guidance content may be provided to a user in one place, organized with a table of contents and or an index, and it may be searchable using keywords. Still, it may be overwhelming to a user to be provided with so much content at once. It is desirable to only provide a limited amount of digital guidance content to a user at any one time, focused on what they may currently need help with and not showing them content that is not currently relevant to what they are doing. Accordingly, a limited number of hyperlinks or other pathways to relevant content may be provided in various sections or segments of the software, and these links may change depending on the task being performed by the end user and or their location in the software application.

Creating the above-mentioned links can be a very time consuming and error prone process for a creator/editor of the digital guidance content, particularly when the amount of content becomes large. The process of manually filtering or mapping the digital guidance content to various locations in the application may be fine for small software applications, but it is not scalable to large applications and or large amounts of guidance content. This problem is exacerbated when new content is added to the guidance and or new pages or locations are added to the underlying software application.

Accordingly, what is needed and is not provided by the prior art are improved systems and methods for delivering contextual help to a user of an underlying software application, while reducing the burden being placed on the creators of the digital guidance content. The innovations described herein solve these unmet needs and provide additional advantages.

SUMMARY OF THE DISCLOSURE

According to aspects of the present disclosure, an exemplary method of providing digital guidance in an underlying computer application includes recording, in a computing device, steps of digital guidance content as the steps are created by a content author. The method also includes automatically segmenting, in the computing device, the digital guidance content as it is being created such that the digital guidance content is only associated with segments of the underlying computer application where the content is relevant. The method further includes making the digital guidance content available for playback to an end user on a computing device only when the end user is in a segment of the underlying computer application that is relevant to the digital guidance content.

In some embodiments of the above method, the content author does not manually map any of the digital guidance content to segments of the underlying computer application. Both the recording step and the automatic segmenting step may be performed by a content authoring module of a digital guidance platform. The method may further include collecting rules from the content author, in the computing device, to be used for automatically segmenting the digital guidance content in the segmenting step, wherein the rules are collected from the content author before the recording step. In some embodiments, the collecting rules step, the recording step and the automatic segmenting step are performed by a content authoring module of a digital guidance platform. The content authoring module may use the rules collected from the content author to automatically associate a location in the underlying software application with each step of the digital guidance content and save the locations with the steps when the content is saved. In some embodiments, the making content available for playback step is performed by a content playback module of the digital guidance platform. In some embodiments, playback of the digital guidance content does not start at a first step of the content but instead automatically starts at a subsequent step based on a segment location of the end user in the underlying computer application.

In some embodiments of the above method, the automatic segmenting of the digital guidance content is based at least in part on a Uniform Resource Locator path or on element hierarchy. The automatic segmenting of the digital guidance content may be based at least in part on one or more page metadata items selected from the group consisting of: element.property; redirect_href; fixed.page; path; path.token; hash; hash.token; query; variable; element_hierarchy and element.exists.

According to aspects of the disclosure, an exemplary non-transitory computing device readable medium having instructions stored thereon for providing digital guidance in an underlying computer application is provided. The instructions are executable by a processor to cause a computing device to record steps of digital guidance content as the steps are created by a content author. The instructions also cause the computing device to automatically segment the digital guidance content as it is being created such that the digital guidance content is only associated with segments of the underlying computer application where the content is relevant. The instructions further cause the computing device to begin playback of the digital guidance content to an end user only when the end user is in a segment of the underlying computer application that is relevant to the digital guidance content.

In some embodiments of the above medium, the instructions are further configured to not require the content author to manually map any of the digital guidance content to segments of the underlying computer application. The instructions may be further configured to perform both the recording step and the automatic segmenting step in a content authoring module of a digital guidance platform. In some embodiments, the instructions are further configured to collect rules from the content author, in the computing device, and use the rules for automatically segmenting the digital guidance content in the segmenting step, wherein the rules are collected from the content author before the recording step. The instructions may be further configured to perform the collecting rules step, the recording step and the automatic segmenting step in a content authoring module of a digital guidance platform. In some embodiments, the instructions are further configured to cause the content authoring module, using the rules collected from the content author, to automatically associate a location in the underlying software application with each step of the digital guidance content and save the locations with the steps when the content is saved. The instructions may be further configured to cause the content playback step to be performed by a content playback module of the digital guidance platform. In some embodiments, the instructions are further configured to cause playback of the digital guidance content to automatically start at a step subsequent to a first step of the content, based on a segment location of the end user in the underlying computer application.

In some embodiments of the above medium, the instructions are further configured such that the automatic segmenting of the digital guidance content is based at least in part on a Uniform Resource Locator path. The instructions may be further configured such that the automatic segmenting of the digital guidance content is based at least in part on element hierarchy. In some embodiments, the instructions are further configured such that the automatic segmenting of the digital guidance content is based at least in part on one or more items selected from the group consisting of: element.property; redirect_href; fixed.page; path; path.token; hash; hash.token; query; variable; element_hierarchy and element.exists. The instructions may be further configured such that the automatic segmenting of the digital guidance content is based at least in part on a role of the end user.

BRIEF DESCRIPTION OF THE DRAWINGS

The novel features of the disclosure are set forth with particularity in the claims that follow. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Described herein are apparatuses (e.g., systems, computing device readable media, devices, etc.) and methods for an improved digital guidance platform. The innovative platform changes the way application support and learning content is consumed. In some embodiments, this is accomplished by providing contextual and interactive walkthroughs inside software applications at the time a task is being performed (i.e. providing real-time guidance to users.) Examples of software applications that the platform may be used with include Salesforce®, Oracle CRM®, Microsoft Dynamics®, Success Factors®, SharePoint® and other applications. In some embodiments, the innovative platform may take the form of a simple web browser extension. Developers of a software application may use the extension to provide guided navigation to users of the software application so that the users can quickly learn how to use the application. The users' training and or support experience can be enhanced with walkthroughs, smart pop-ups and tool-tips provided by the platform. These platform tools may be configured to show up based on a particular user's role and current location in the software application. The innovative platform may be used with enterprise application software (such as the software applications mentioned above), custom application software (such as created by an IT department for a company's internal use), and end user software. Depending on the application, the innovative platform may the only training and support program for the application, or it may be used in conjunction with a training and support program native to the application.

In some embodiments, the innovative platform supports an end user through their entire life cycle with a software application. This may include new user onboarding, continuous training, self-serve contextual support, assistance with data field validation, and application change management. The platform technology may include omni-channel integrations (such as integrating with knowledge systems, bases and repositories), workflow automation, in-place answers, workflow analytics, and content authoring.

Figure 1:
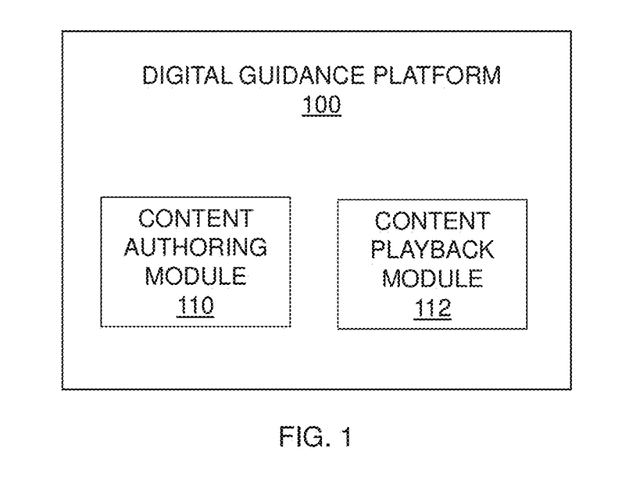
FIG. 1 is a diagram showing an example of a digital guidance platform configuration for providing digital guidance in an underlying computer application.

Referring to FIG. 1, an exemplary digital guidance platform 100 is depicted. It may include a content authoring module 110 (also referred to as an editor) and a content playback module 112, as shown. In this exemplary embodiment, the content authoring module 110 allows a content author to create digital guidance for end users of an underlying software application. Once this content is created and saved, it may be accessed or "played back" using the content playback module 112. In some implementations, the content authoring module 110 and the content playback module 112 are combined and provided to a content author in a single software package. In use, the software package may reside on a content author's computer, and or may reside on a server in "the cloud" and be offered as Software as a Service (SaaS.) In other implementations, content authoring module 110 and a content playback module 112 may be separately deployed. For example, one of the modules may take the form of a simple web browser extension as previously mentioned, and the other module may be downloaded to a content author's computer.

Figure 2:
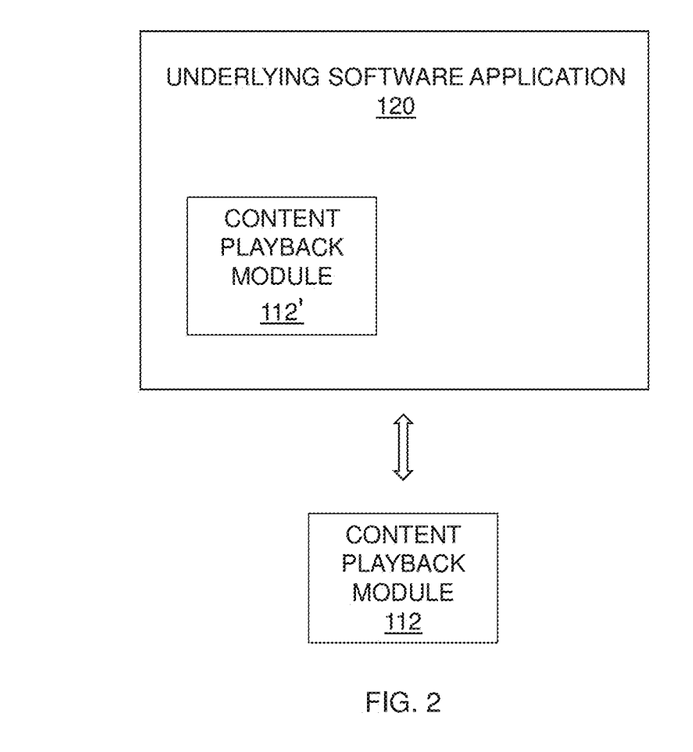
FIG. 2 is a diagram showing exemplary configurations of how the digital guidance platform of FIG. 1 interfaces with an underlying computer application.

Referring to FIG. 2, exemplary content playback configurations are depicted. In some implementations, content playback module 112 is a standalone system that is accessed by an end user from within an underlying software application 120. For example, an underlying software application 120, such as Salesforce®, may be provided with links to access content playback module 112, which is located on a server in the cloud. In some implementations, content playback module 112' may be integrated within the underlying software application 112'. In either of these exemplary configurations, the end user is able to access the digital guidance content from content playback module 112 or 112' while using a feature of underlying software application 120 with which the content is associated. In some implementations, both an integrated content playback module 112' and an external module 112 are available to the end user.

Figure 3A:
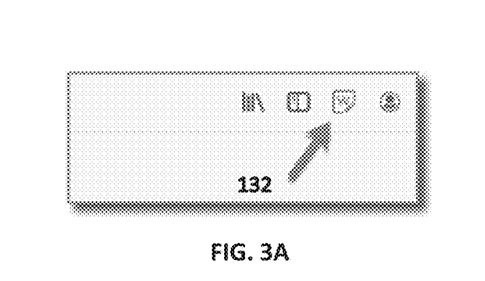
FIGS. 3A-3I are a series of partial screenshots showing exemplary functionality of a content authoring module/editor.

Referring to FIGS. 3A-3I, exemplary functionality of content authoring module/editor 110 will be described in relation to the exemplary partial screenshots in the figures. In this exemplary embodiment, the patent applicant's company name "whatfix" is used as the name of digital guidance platform 100. The exemplary functionality includes the ability to create a "walkthrough", which will walk an end user of underlying software application 120 through each sequential step of a particular task in application 120 when the walkthrough is played back. In some implementations, the walkthrough can proceed either one step at a time, waiting at the end of each step for the end user to advance the walkthrough to the next step. Alternatively, the walkthrough can proceed automatically, running through all of the steps without stopping (unless paused by the user.) Additionally, the walkthrough can provide the end result of the task that the walkthrough is teaching. For example, a walkthrough can show an end user each step needed to determine the number of open sales leads that have not been contacted, and at the end of the walkthrough the actual number is provided to the end user. Referring first to FIG. 3A, the creation of a walkthrough begins by the author logging in to the underlying application where the author wants to create content, and then launching the previously described content authoring module/editor 110 by clicking icon 132.

Figure 3B:
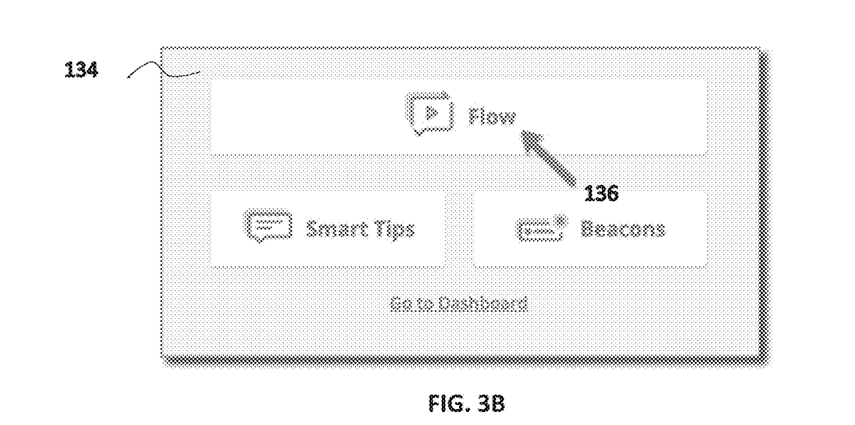

Once the editor launches, it displays window 134 as shown in FIG. 3B. Window 134 includes three buttons labeled Flow, Smart Tips and Beacons. The Flow button is for creating walkthroughs, the Smart Tips button is for creating content associated with data field validation, and the Beacons button is for creating content associated with software application change management. In this example the author clicks the Flow button 136.

Figure 3C:
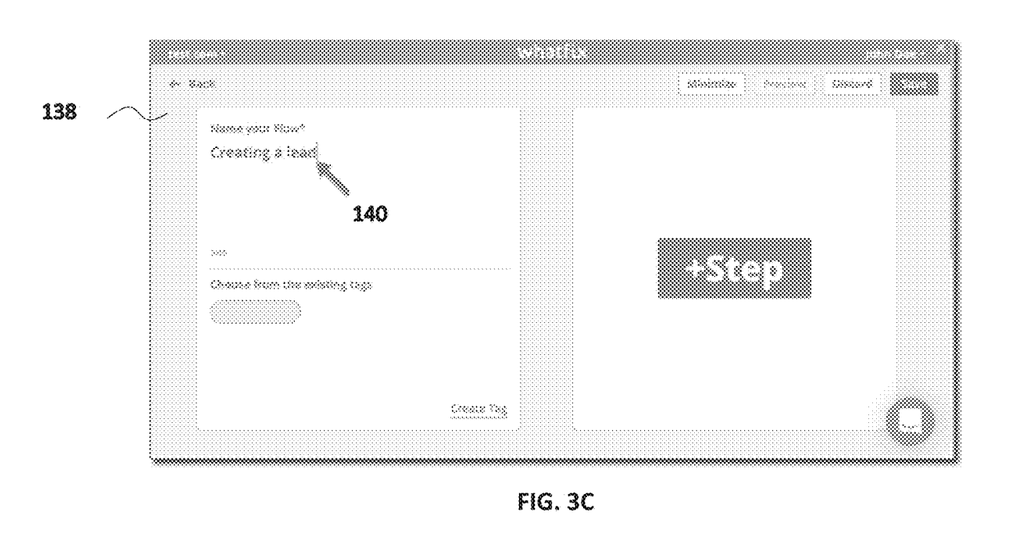

Clicking Flow button 136 opens window 138, as shown in FIG. 3C. Here the author can name the Flow or walkthrough as they want it to be displayed to an end user. In this example, the Flow is named "Creating a lead", as shown by arrow 140.

Figure 3D:
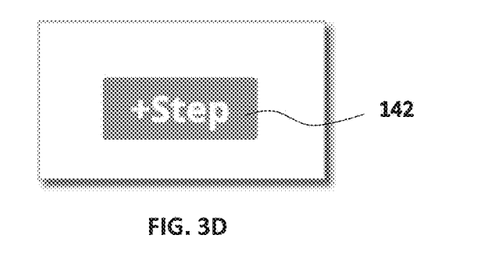
Figure 3E:
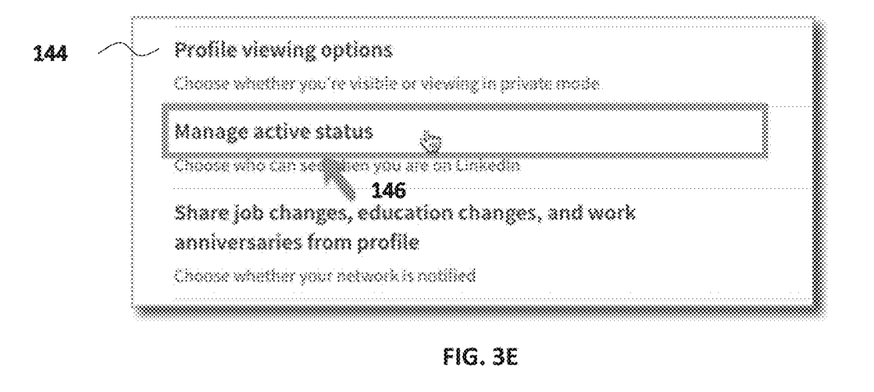

The author then clicks the +Step button 142, as shown in FIG. 3D. In some embodiments, the pointer icon changes (such as from an arrow to a hand), as shown in screen 144 of FIG. 3E, to indicate that the editor is waiting for the author to select a step of the sequence that the end user is to be guided through. The author then clicks the desired element on the page of the underlying software application that the end user will need to select. In this example, the end user will be guided to select the Manage Active Status button 146 on screen 144 during playback of the walkthrough, so the Flow author clicks button 146 at this time.

Figure 3F:
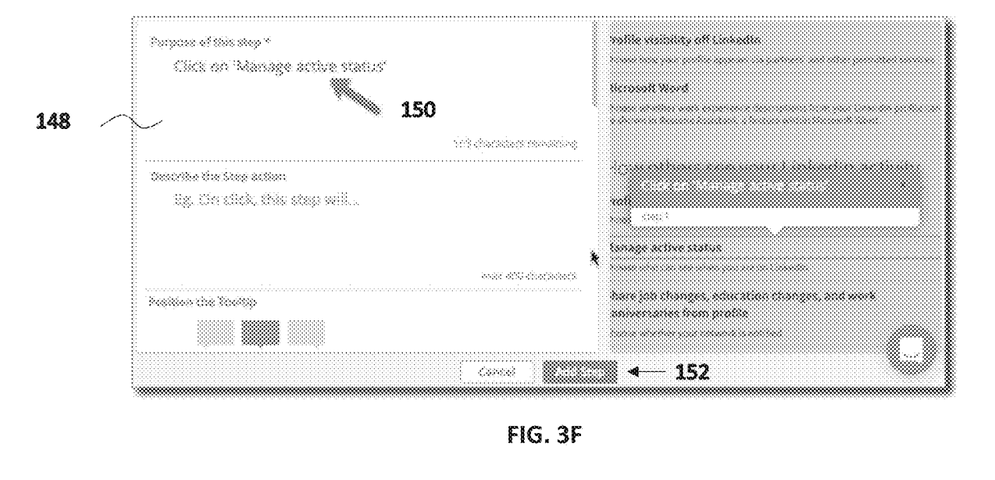

After the Flow author clicks the desired element 146, the editor module displays screen 148 as shown in FIG. 3F with automatically generated action text 150 describing the particular step. The Flow author may then review, edit and or add text or other information associated with the step. The author may also select other parameters regarding how this step of the walkthrough will be played back, such as the position of the Tooltip on the screen, or accept some or all of the default settings. Once the parameters of this step are in order, the author then clicks the Add Step button 152.

Figure 3G:
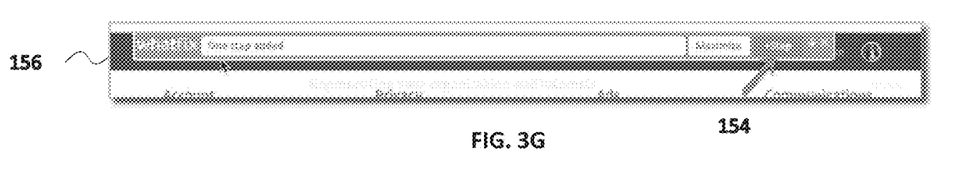
Figure 3H:
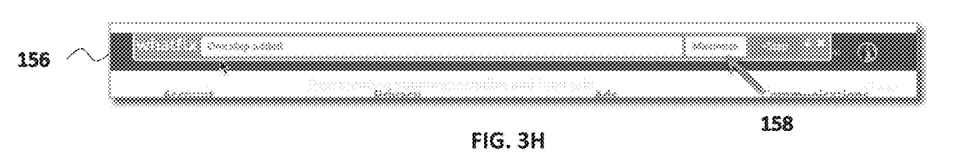
Figure 3I:
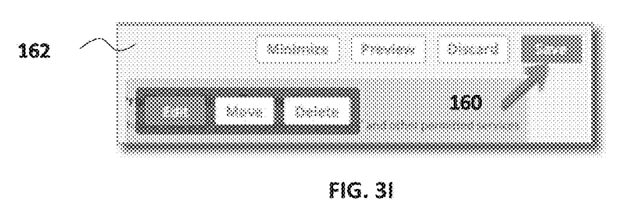

To capture the next step in the sequence, the Flow author then navigates to where in the underlying software application the author wants to start the next step. The author then clicks the +Step button 154 in the editor toolbar 156, as shown in FIG. 3G. The pointer icon again changes to indicate that the editor is waiting for the author to select another step of the sequence, as previously described in reference to FIG. 3E. The author then repeats the intervening actions described above for each step that is to be added to the Flow sequence. When all the steps have been captured, the author clicks the Maximize button 158 on the editor toolbar 156, as shown in FIG. 3H, and then clicks the Save button 160 after window 162 opens, as shown in FIG. 3I.

Before various walkthroughs are made available to end users of the underlying software application, segmentation or mapping may be used to associate each walkthrough with a particular page or part of the underlying software. Segmentation helps content authors display only walkthroughs that are relevant to end users when they are on a particular page. Segmentation, as the name implies, provides a way of targeting walkthroughs to specific users on "widgets" like Self-help and Task List on previously described content playback module 112. Segments can be defined through various conditions and rules. In some embodiments, a segment can be built to filter walkthroughs as per user login, the contents of a Uniform Resource Locator (URL), elements on the screen, and/or a mix of other criteria. For example, segments may be used to display walkthroughs based on a particular group of users' logins, a current tab an end user is on, visual elements on pages of the underlying software and/or other variable defined by the walkthrough author.

Figure 4A:
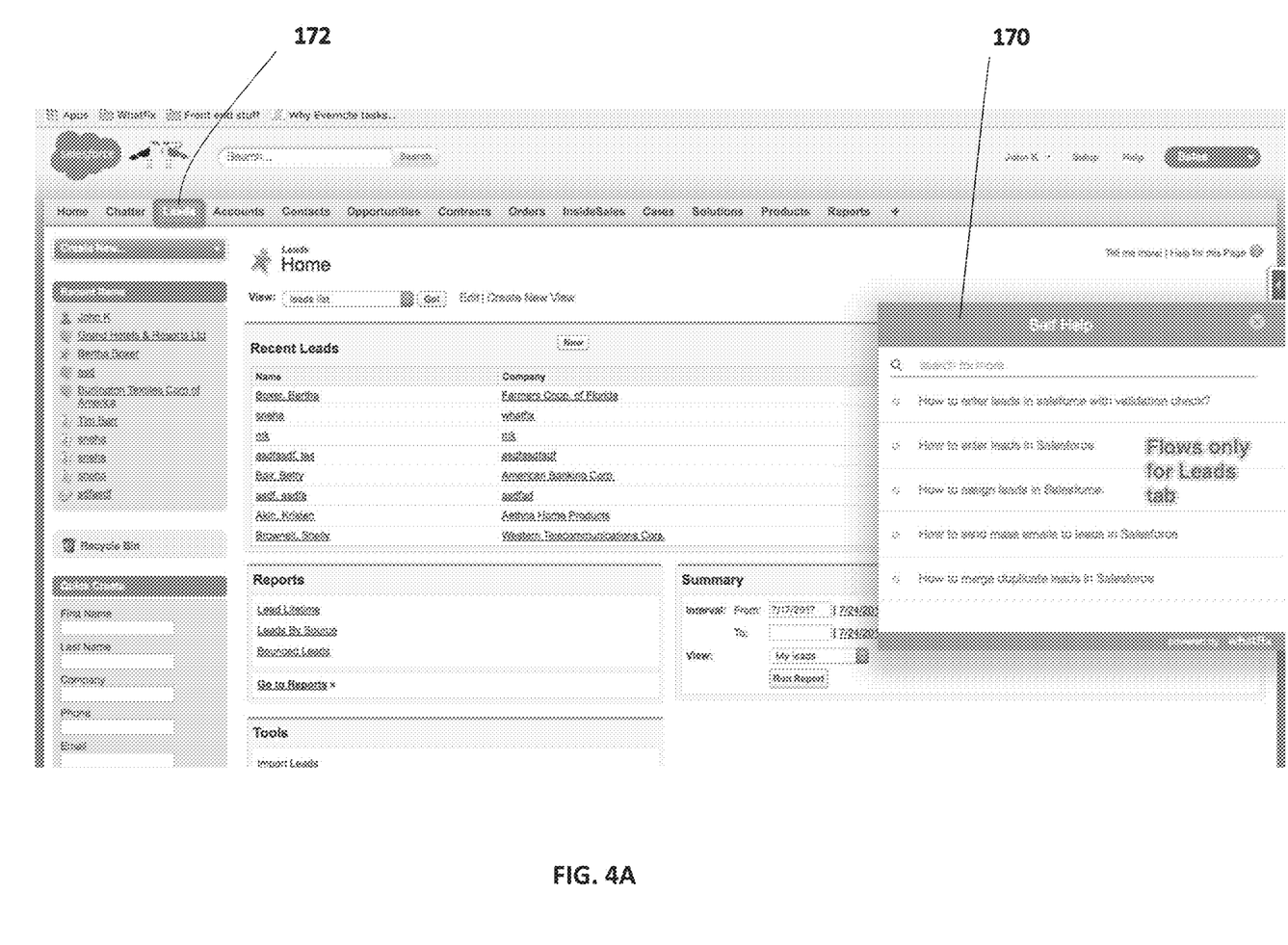
FIGS. 4A and 4B are screenshots showing examples of different lists of walkthroughs that are displayed by a content playback module depending on the location of an end user in an underlying software application.
Figure 4B:
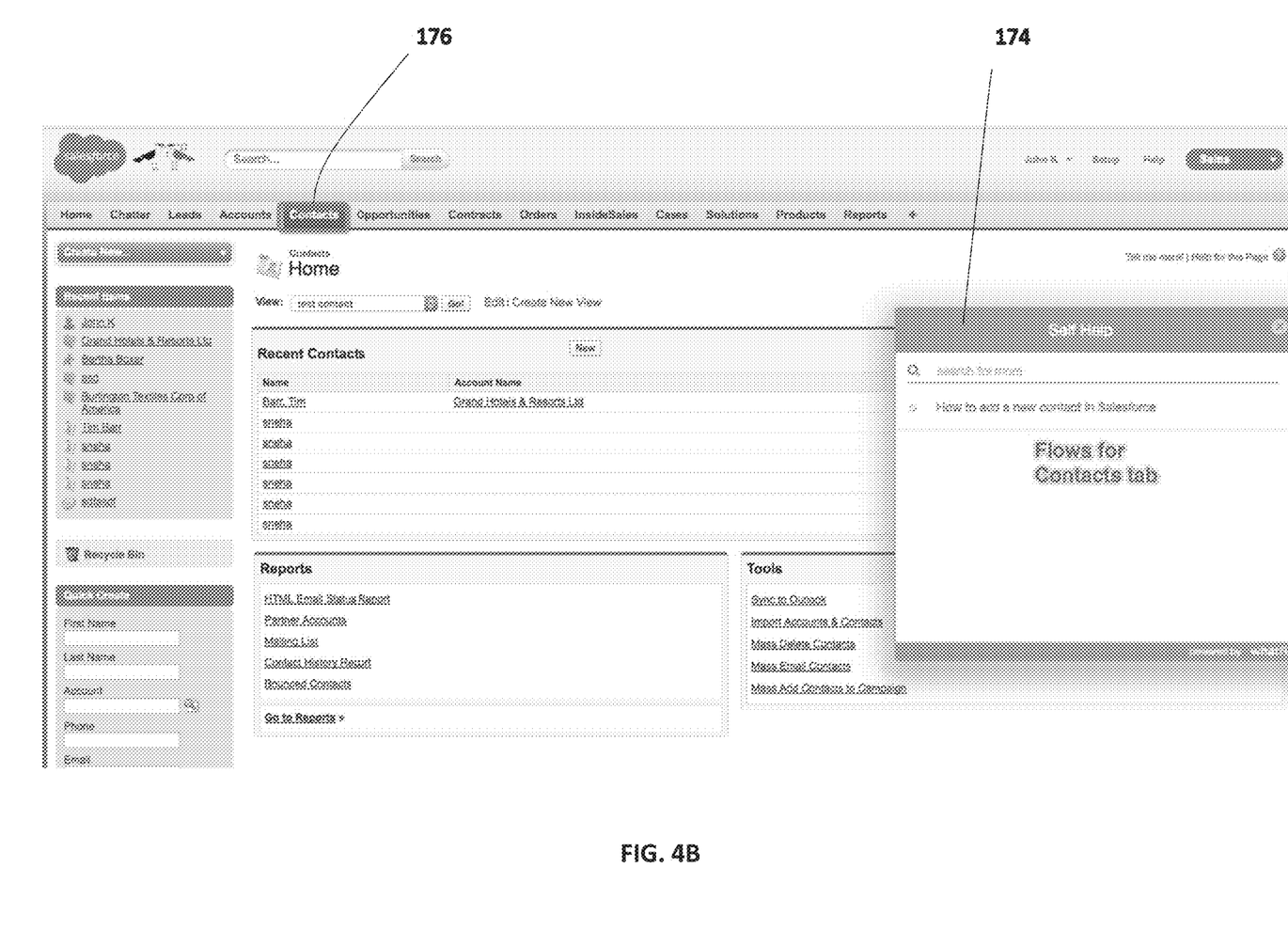

In one embodiment, a page of the underlying software application may have two different tabs, for example: Leads and Contacts. Using segments, different walkthroughs can be displayed depending on which tab the end user navigates to. Rather than seeing a long list of help content, the end user only sees contextual content that is relevant to the particular page and tab currently being used. FIG. 4A shows an example of a list of walkthroughs 170 that is displayed by content playback module 112 when the end user has navigated to the Leads tab 172 of an underlying Salesforce application and clicked on Self Help. FIG. 4B shows an example of a different list of walkthroughs 174 that is displayed by module 112 when the end user has navigated to the Contacts tab 176.

Segments can be created through a simple selection of walkthroughs and visibility rules provided in the editor module 110. To segment walkthroughs, an author can manually select all the necessary flows/walkthroughs to display on a particular page of the application. Segmentation can be set up based on tags as well. Tags can be as simple as a user group or the page/module name. Segmentation of flows can be set up through single or multiple tags. In some embodiments, the editor module 110 can perform segmentation on the basis of visual elements found in the application. The editor can segment flows based on visual elements present or absent on various pages of the underlying application.

Referring to FIGS. 5A-5I, specific examples of types of segmentation criteria that may be used are provided.

Figure 5A:
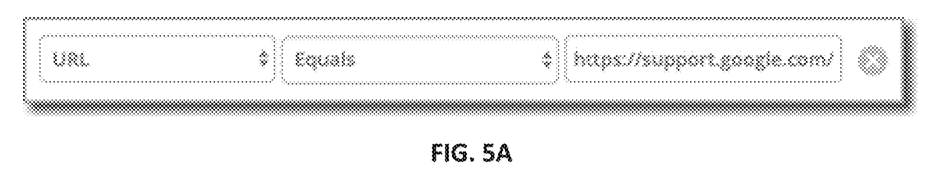
FIGS. 5A-5I are a series of partial screenshots showing examples of types of segmentation criteria.

Referring to FIG. 5A, a Uniform Resource Locator (URL) may be used to segment flows. In some embodiments, any part of the URL may be specified as a visibility rule. For example, the URL Hostname, path, parameter, etc. may be specified using this criterion.

Figure 5B:
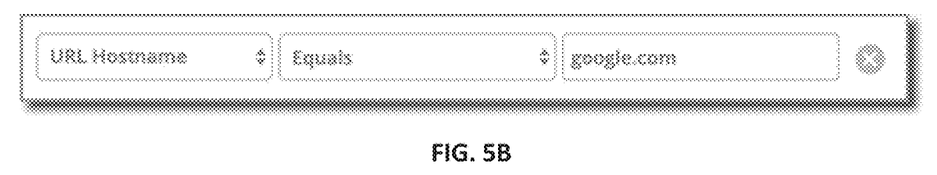

Referring to FIG. 5B, a URL Hostname may be used to segment flows. In some implementations, a content author may want to uniquely identify a page using the domain name and can use this condition. The URL Hostname is the first part of any URL. For example, if the author wished to display the tip only if the end user is on google.com, she can add a condition as shown in the screenshot of FIG. 5B.

Figure 5C:
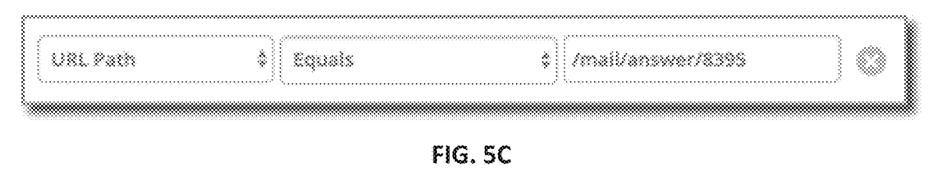

Referring to FIG. 5C, a URL Path may be used to segment flows. The website path name is what is listed between a domain name and the parameters or hashes. For example, if the website URL is //support.google.com/mail/answer/8395?h1=en&ref_topic=3394219, then the pathname is /mail/answer/8395. This condition may be specified as shown in FIG. 5C.

Figure 5D:
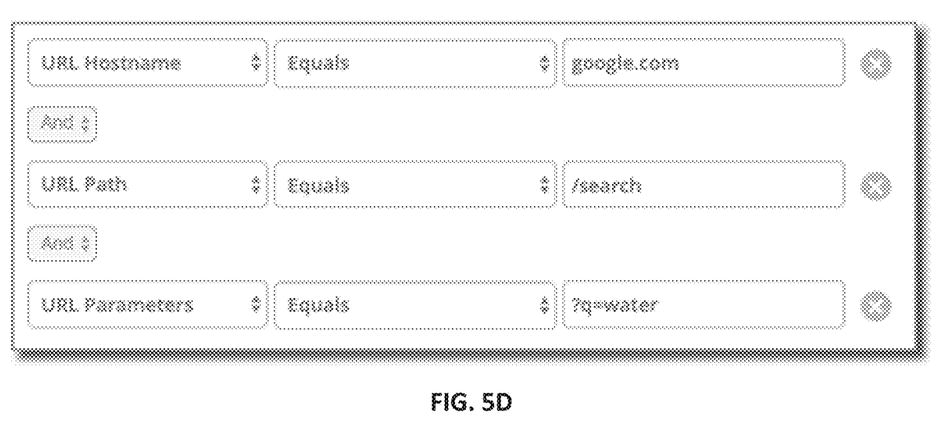

Referring to FIG. 5D, a URL Parameter may be used to segment flows. If an author wishes to identify a web page using the parameters on the URL, this condition may be used. For example, if a tip is to be shown to a user only when the search phrase has "water" in Google, this can be set up as shown in FIG. 5D. In this example, three conditions need to be met: 1) the page must be google.com (URL Hostname); 2) the pathname is /search (URL Path); and 3) the query parameter is ?q=water.

Figure 5E:
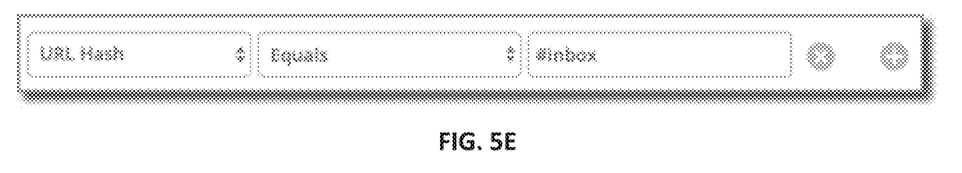

Referring to FIG. 5E, a URL Hash may be used to segment flows. In particular, a page may be identified using the hash value of the URL using this condition. Hashes are usually present in Single page applications made using AngularJs or ReactJs. Typically there are no page refreshes but only Hash changes.

Figure 5F:
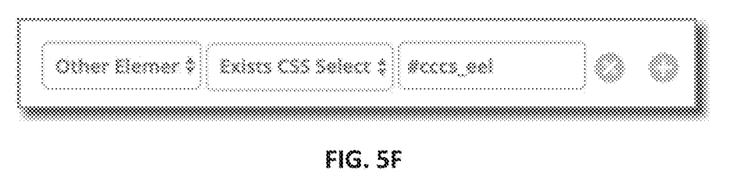

Referring to FIG. 5F, Other Elements may be used to segment flows. For example, if a content author wants to identify a page based on the presence of a particular element (other than the one selected by the author for the flow) on the web page, this condition can be used. In some embodiments, the values passed to this condition are Cascading Style Sheets (CSS) selectors, such as #ID, .class or Jquery. Cascading Style Sheets is a stylesheet language used to describe the presentation of a document written in HTML or XML. CSS describes how elements should be rendered on screen or on other media. Note that in some implementations, use of this condition to segment flows can slow down the underlying application. Further information on the use of CSS selectors may be found on the internet, such as at https://developer.mozilla.org/en-US/docs/Web/CSS/CSS_Selectors.

Figure 5G:
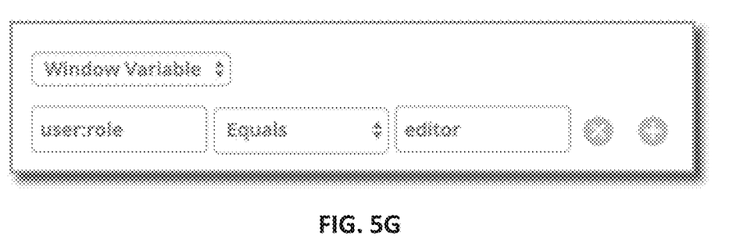

Referring to FIG. 5G, a Window Variable may be used to segment flows. In some implementations, a value of a particular Javascript global variable is used to identify conditions for showing tooltips. For example, an option to check "user.role='admin'" may be provided to set this condition. This option may also be to perform comparisons, such as using the following criteria: Greater than; Less than; Date Greater than; or Date Less than.

Figure 5H:
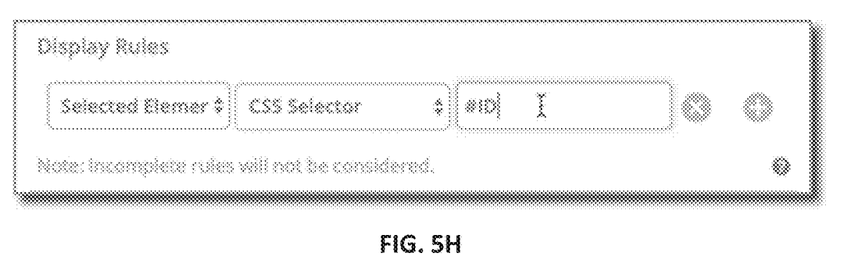

Referring to FIG. 5H, an Element CSS Selector/JQuery may be used to segment flows. In some implementations, the application uses unique IDs for some elements on the page. This option may be used when the element is selected from a list of options. For example, a drop-down menu. This lets an author provide their own CSS selector identifier for the element. Sample values include: #ID_ELEMENT; CLASS-NAME; input[title="Search"]; and $("#ID").

Figure 5I:
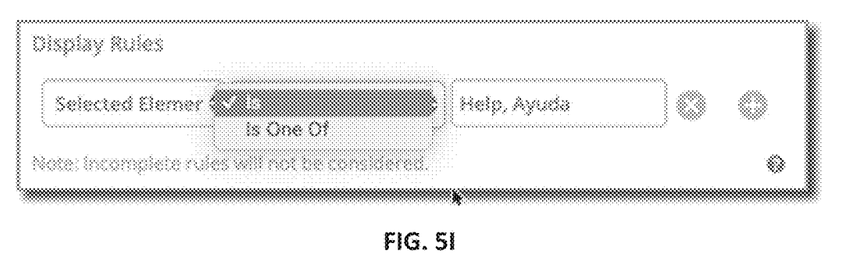

Referring to FIG. 5I, an Element Text may be used to segment flows. In some implementations, this is the text that is displayed on the Element selector that is described above in reference to FIG. 5H. If an application supports multiple languages, the option "is one of" may be chosen and the name added with a comma (,) as a delimiter.

The exemplary segmentation criteria described above with reference to FIGS. 5A-5I may be used to manually segment various flows/walkthroughs and other content. According to aspects of the disclosure, editor module 110 may also be configured to automatically segment the content. In some embodiments, the content is automatically segmented as it is created, with no additional steps required by the content author. This may be referred to as "intelligent segmentation" (IS). In some embodiments, intelligent segmentation eliminates the need to create multiple segments (manually) to display relevant content contextually to different audiences on an underlying application. For example, if an underlying application has five pages and two user roles, traditionally ten segments would need to be created to ensure that each kind of user sees only the relevant topics on each of the five pages. But when intelligent segmentation is enabled and content is being created, editor module 110 can automatically determine which content is to be shown on which page. In some embodiment, editor module 110 can do this based on where the walkthrough was created and certain other pre-defined criterion. The content author need not do any additional configuration as more content is created.

Intelligent segmentation can also ensure that if an end user is not on the first screen of a walkthrough, playback of the walkthrough starts from the most relevant page that the user is on. For example, the walkthrough that the user is launching may have 10 steps. If the user is already in step 3 on the application and then decides to launch the walkthrough, IS ensures that the walkthrough starts from step 4 and not from the earlier steps that the user has already completed.

In some embodiments, editor module 110 may be configured to allow content authors to set rules, such as before they create content, that better enable editor module 110 to automatically segment the content as it is being created. Referring to FIGS. 6A-6D, an exemplary embodiment is provided for setting such IS rules. In this embodiment, a rule configuration window 180 opens to allow an author to configure the IS rules. In this embodiment, window 180 includes three fields 182, 184 and 186 used in combination to set the IS rules. Each field is provided with a dropdown menu. Field 182 may be used to select the general type of condition that is being set by the rule. Field 184 may be used to select the type of action to be taken with a particular condition, and field 186 may be used to select a value, range or parameter associated with the action. Once set, these fields contribute to the configuration for IS. This configuration may be used to read the page context at the time of content step creation.

In some embodiments, the above IS rules can be categorized into two types:
1. Boolean rules—The output of executing these rules will be either true or false; and
2. Conditional rules—The output of executing these rules will be some condition that will represent a page.

Figure 6A:
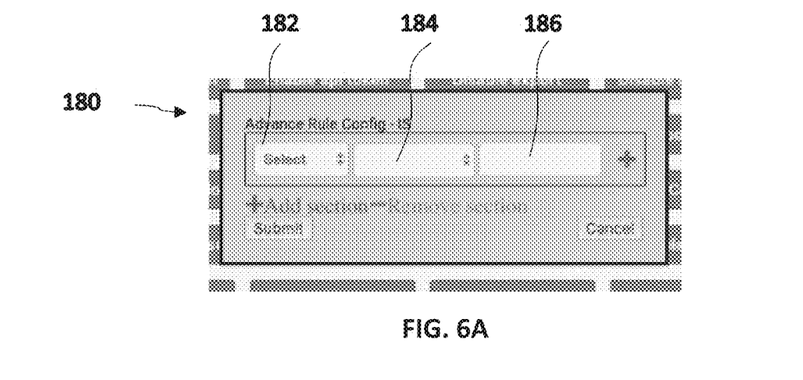
FIGS. 6A-6D are a series of partial screenshots showing an exemplary embodiment for setting intelligent segmentation rules.
Figure 6B:
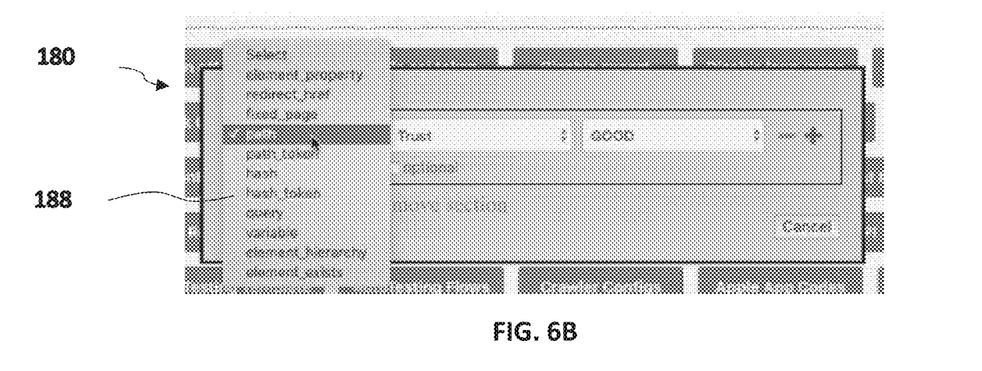
Figure 6C:
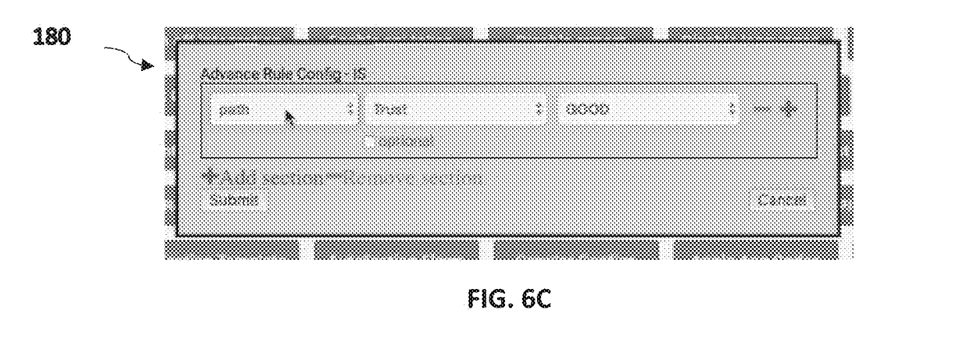

Referring to FIG. 6B, an exemplary dropdown menu 188 is shown that appears when field 182 is selected. It shows various general types of conditions that can be configured. For example, when "path" is selected as shown, field 184 is populated with default setting "Trust" and field 186 is populated with "Good", as shown in FIG. 6C. This particular rule setting represents a conditional rule and lets editor module 110 know that the URL paths may be used to automatically segment content being developed for the current underlying application. More specifically, this setting says that the level of "trust" that can be placed on the path is "good." In this embodiment, the content author can change the default settings for "path" to reflect different levels of trust or distrust in the path for segmenting content. Depending which option is selected in field 182, the menus for fields 184 and or 186 may change. For example, the options for field 184 may include operators such as: Trust; Equals; Not Equals; Contains; Not Contains; Starts With; etc. The options for field 186 may include values such as:

GOOD; WITHOUT_NUMERIC; WITHOUT_ALPHANU-MERIC; DYNAMIC_PART; etc.

Figure 6D:
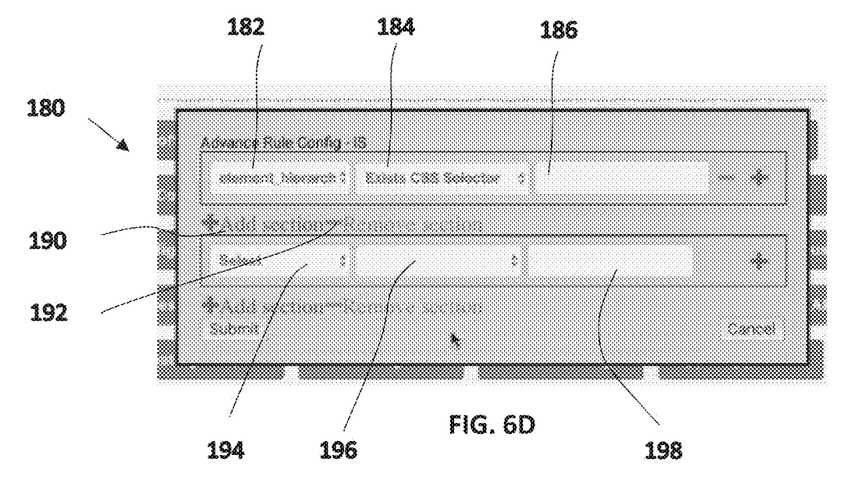

Referring to FIGS. 6B and 6D, another option that may be selected for field 182 in the above exemplary embodiment is "element hierarchy." This setting represents a Boolean rule. As shown in FIG. 6D, when this condition is selected, a default setting of "Exists CSS Selector" appears in field 184. This rule setting lets editor module 110 know that element hierarchy may be used to automatically segment content being developed for the current underlying application. In particular, this rule will evaluate to true if the captured element is within the element obtained by the provided selector in the rule.

In the exemplary embodiment shown in FIGS. 6A-6D, the following settings may also be selected:

Element_Exists-CSS_Selector-<selector>
This is a Boolean rule. The rule will evaluate to true if the element, obtained by the provided selector in the rule, exists in the current page.

Path/Hash Token-Trust-1,2
This is a conditional rule. The output of this rule will be conditions generated by trusting the current 1,2 token of Pat/Hash. For example, if the path is /home/view/123, generated conditions will be, path_token 1=home & path_token 2=view.

Query/Variable-Trust-wfx_var
This is a conditional rule. The output of this rule will be conditions generated by trusting the current value of wfx_var of query/variable. For example, if the Query is ?wfx_va=value, the generated condition will be query wfx_var=value. If the variable is wfx_var=value, the generated condition will be variable wfx_var=value.

Fixed_page-Trust-Home
This is a conditional rule. The output of this rule will be conditions generated by copying the exact rule. For example, the generated condition of the above rule will be Fixed_page 1=Home Referring to FIG. 6D, IS rule configuration window 180 may be provided with an Add Section button 190 and a Remove Section button 192. Clicking on the add button 190 adds another rule configuration line immediately below the button, as shown. The new line has three more fields 194, 196 and 198, similar to the three fields of the first line described above. With this arrangement, multiple rules can be configured on two or more lines such that they work in concert. In some embodiments, each rule carries the same weight. In other embodiments, the rule in the first line is processed first and carries the most weight, then the rule in the second line is processed, and subsequent rule lines, if any, are processed in order. The Remove Section button 192 may be used to remove the rule line immediately above it. Plus and minus buttons may also be provided for each line, such as those on the right of the first line in FIG. 6D. These buttons may be used to add or subtract fields to or from a line when appropriate.

As described above for flows/walkthroughs, the same or similar functionality may be provided for Smart tips, Beacons and/or other content. In this way, intelligent segmentation may be used for various types of digital guidance content.

Various alternatives, modifications, and equivalents may be used in lieu of the above components. Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code may be applied to data entered using an input device to perform the functions described and to generate output information. The output information may be applied to one or more output devices.

Each program may be implemented in a high-level procedural or object-oriented programming language to operate in conjunction with a computer system. However, the programs may be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Thus, any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control or perform any of the steps, including but not limited to: displaying, communicating with the user, analyzing, modifying parameters (including timing, frequency, intensity, etc.), determining, alerting, or the like.

While exemplary embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the disclosure. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present disclosure.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and/or methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims. When a feature is described as optional, that does not necessarily mean that other features not described as optional are required.

The examples and illustrations included herein show, by way of illustration and not of limitation, specific embodiments in which the subject matter may be practiced. As mentioned, other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of providing digital guidance in an underlying computer application, the method comprising the steps of:
   collecting a plurality of rules from a content author, in a computing device, to be used for automatically segmenting the digital guidance content, each of the plurality of rules having a plurality of options from which the content author selects;
   after collecting the plurality of rules from the content author, recording, in the computing device, steps of digital guidance content as the steps are created by the content author;
   automatically segmenting, in the computing device, the digital guidance content as it is being created such that the digital guidance content is only associated with segments of the underlying computer application where the content is relevant, wherein the automatically segmenting is based at least in part on the options selected by the content author in the rule collecting step; and
   making the digital guidance content available for playback to an end user on a computing device only when the end user is in a segment of the underlying computer application that is relevant to the digital guidance content.

2. The method of claim 1, wherein the content author does not manually map any of the digital guidance content to segments of the underlying computer application.

3. The method of claim 1, wherein both the recording step and the automatic segmenting step are performed by a content authoring module of a digital guidance platform.

4. The method of claim 1, wherein the collecting rules step, the recording step and the automatic segmenting step are performed by a content authoring module of a digital guidance platform.

5. The method of claim 4, wherein the content authoring module, using the rules collected from the content author, automatically associates a location in the underlying software application with each step of the digital guidance content and saves the locations with the steps when the content is saved.

6. The method of claim 4, wherein the making content available for playback step is performed by a content playback module of the digital guidance platform.

7. The method of claim 1, wherein playback of the digital guidance content does not start at a first step of the content but instead automatically starts at a subsequent step based on a segment location of the end user in the underlying computer application.

8. The method of claim 1, wherein the automatic segmenting of the digital guidance content is based at least in part on a Uniform Resource Locator path.

9. The method of claim 1, wherein the automatic segmenting of the digital guidance content is based at least in part on element hierarchy.

10. The method of claim 1, wherein the automatic segmenting of the digital guidance content is based at least in part on one or more page metadata items selected from the group consisting of: element.property; redirect_href; fixed.page; path; path.token; hash; hash.token; query; variable; element_hierarchy and element.exists.

11. A non-transitory computing device readable medium having instructions stored thereon for providing digital guidance in an underlying computer application, wherein the instructions are executable by a processor to cause a computing device to:
   collect a plurality of rules from a content author to be used for automatically segmenting the digital guidance content, each of the plurality of rules having a plurality of options from which the content author selects;
   after collecting the plurality of rules from the content author, record steps of digital guidance content as the steps are created by the content author;
   automatically segment the digital guidance content as it is being created such that the digital guidance content is only associated with segments of the underlying computer application where the content is relevant, wherein the automatically segment step is based at least in part on the options selected by the content author in the rule collect step; and
   begin playback of the digital guidance content to an end user only when the end user is in a segment of the underlying computer application that is relevant to the digital guidance content.

12. The non-transitory computing device readable medium of claim 11, wherein the instructions are further configured to not require the content author to manually map any of the digital guidance content to segments of the underlying computer application.

13. The non-transitory computing device readable medium of claim 11, wherein the instructions are further configured to perform both the recording step and the automatic segmenting step in a content authoring module of a digital guidance platform.

14. The non-transitory computing device readable medium of claim 11, wherein the instructions are further configured to perform the collecting rules step, the recording step and the automatic segmenting step in a content authoring module of a digital guidance platform.

15. The non-transitory computing device readable medium of claim 14, wherein the instructions are further configured to cause the content authoring module, using the rules collected from the content author, to automatically associate a location in the underlying software application with each step of the digital guidance content and save the locations with the steps when the content is saved.

16. The non-transitory computing device readable medium of claim 14, wherein the instructions are further configured to cause the content playback step to be performed by a content playback module of the digital guidance platform.

17. The non-transitory computing device readable medium of claim 11, wherein the instructions are further configured to cause playback of the digital guidance content to automatically start at a step subsequent to a first step of the content, based on a segment location of the end user in the underlying computer application.

18. The non-transitory computing device readable medium of claim 11, wherein the instructions are further configured such that the automatic segmenting of the digital guidance content is based at least in part on a Uniform Resource Locator path.

19. The non-transitory computing device readable medium of claim 11, wherein the instructions are further configured such that the automatic segmenting of the digital guidance content is based at least in part on element hierarchy.

20. The non-transitory computing device readable medium of claim 11, wherein the instructions are further configured such that the automatic segmenting of the digital guidance content is based at least in part on one or more items selected from the group consisting of:

element.property; redirect_href; fixed.page; path; path.token; hash; hash.token; query; variable; element_hierarchy and element.exists.

21. The non-transitory computing device readable medium of claim 11, wherein the instructions are further configured such that the automatic segmenting of the digital guidance content is based at least in part on a role of the end user.

22. The method of claim 1, wherein the plurality of rules that are collected from the content author comprise both a Boolean rule, the output of which will be either true or false, and a conditional rule, the output of which will be some condition that will represent a page.

23. The method of claim 1, wherein during the rule collecting step a rule configuration window opens to allow the content author to configure the rules, the rule configuration window having at least a first field, a second field and a third field, each of the first, the second and the third fields being used in combination to set the rules, each of the first, the second and the third fields being provided with a dropdown menu.

24. The method of claim 23, wherein the first field may be used to select a general type of condition that is being set by a rule, wherein the second field may be used to select a type of action to be taken with a particular condition, and wherein the third field may be used to select a value, range or parameter associated with the action.

* * * * *